United States Patent [19]

Salvatore

[11] 4,241,631
[45] Dec. 30, 1980

[54] MACHINE FOR PUNCHING, NIBBLING, ROUNDING OFF AND CUTTING ANY KIND OF SHEETS OR PLATES, AND FOR SIMILAR OPERATIONS

[76] Inventor: Costanzo Salvatore, Via Meucci 9, Gaggiano (Milan), Italy

[21] Appl. No.: 26,000

[22] Filed: Apr. 2, 1979

[51] Int. Cl.³ .............................................. B26D 7/26
[52] U.S. Cl. ............................... 83/411 R; 83/601; 83/608; 83/632; 83/700; 83/916
[58] Field of Search ............... 83/916, 411 R, 608, 83/700, 601, 687, 685, 606, 859, 699, 632

[56] References Cited

U.S. PATENT DOCUMENTS

| 499,650 | 6/1893 | Breitenbach | 83/608 |
|---|---|---|---|
| 911,900 | 2/1909 | Newman | 83/608 |
| 2,343,697 | 3/1944 | Ople | 83/916 X |
| 2,477,295 | 7/1949 | Garwood | 83/608 X |
| 3,906,826 | 9/1975 | Middendorf | 83/411 R X |
| 3,996,831 | 12/1976 | Gale | 83/601 X |
| 4,023,788 | 5/1977 | Herb et al. | 83/916 X |
| 4,089,244 | 5/1978 | Herb et al. | 83/916 X |

Primary Examiner—Frank T. Yost

[57] ABSTRACT

The machine comprises an operating arm accommodated with a pair of horizontally extending shoulders and is rockingly supported by a pin pivoted on parallel vertical supporting standards or uprights for said shoulders and forming part of the machine bedplate. The pin may be vertically moved along slots formed on said standards or uprights. The working plane is horizontal and may be rotated about a vertical axis and with said shoulders forms a cavity. Said plane has attached thereon the several counter-tools for the punching, nibbling and cutting operations and peripherally has cut profiles for rounding off. A mechanism is carried by the horizontal shoulders to cause the rocking movement for said operating arm and relative associated toolholders.

9 Claims, 8 Drawing Figures

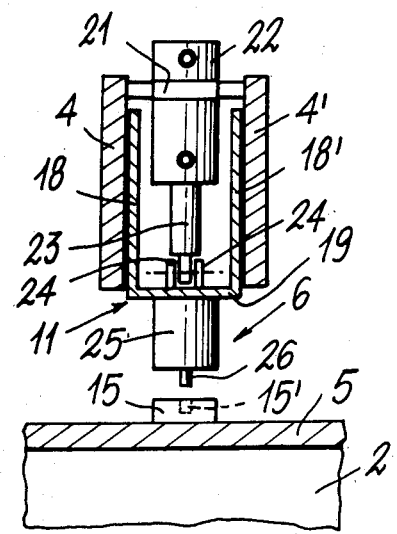
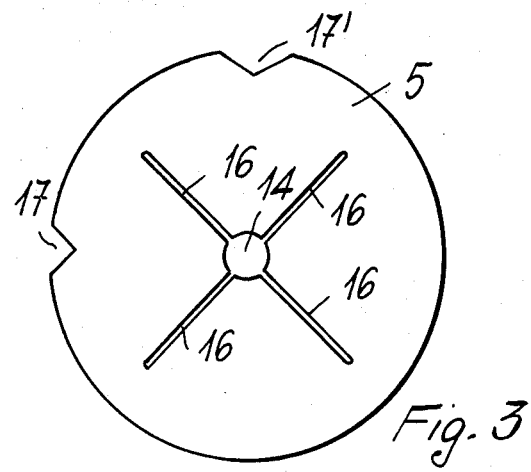
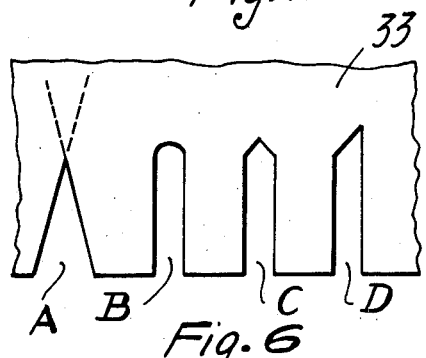
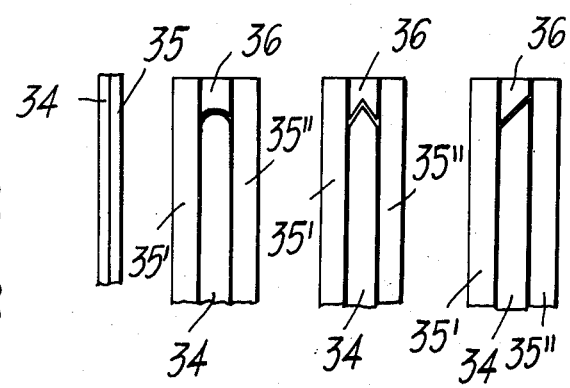
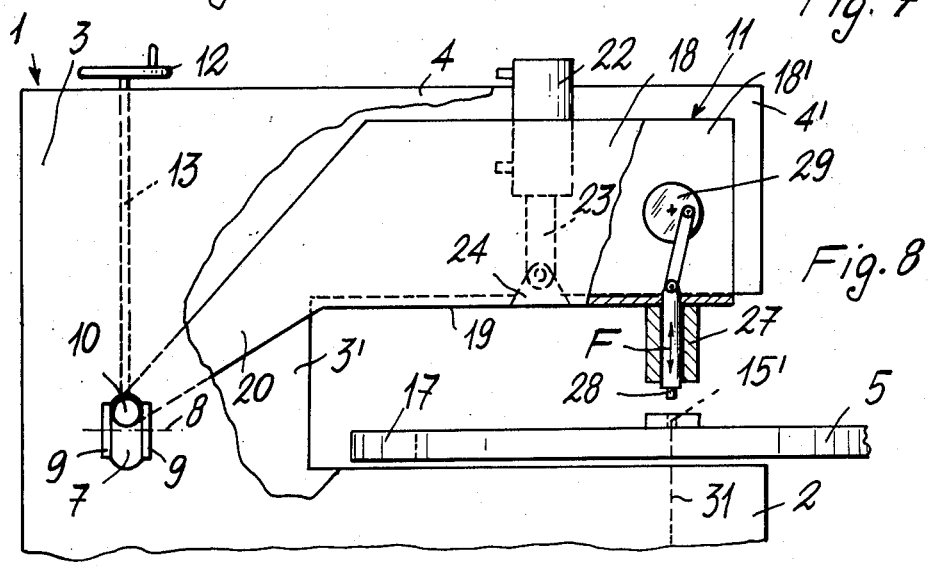

MACHINE FOR PUNCHING, NIBBLING, ROUNDING OFF AND CUTTING ANY KIND OF SHEETS OR PLATES, AND FOR SIMILAR OPERATIONS

This patent application for industrial invention relates to a machine for punching, nibbling, rounding off and cutting any kind of sheets or plates, and for similar operations.

The conventional art provides machines, each of which intended for carrying out one single operation, which substantially weighs heavily on processing and installation costs.

Additionally, because of the particular structure thereof, conventional cutting machines do not enable the execution of cuts transversely, or substantially transversely, concerning only a portion of the sheet or plate. Only some machines enable the execution of partial transverse cuts, but at the sacrifice of quite severe restrictions.

According to the present technology, particular profiles of cuts, transverse or substantially transverse to the sheet or plate, can be obtained only by long complicated operations, such as by oxyhydrogen flame or nibbling, and in some cases only by sawing.

It is the object of the present invention to provide capable by simple replacement of the tools and rapid adjustment of parts of carrying out such operations as punching, nibbling, rounding off and cutting of any kind of sheets or plates, and for similar operations.

It is another object of the invention to provide a machine of the type above referred to, which is of relatively simple structure, maintenance and control.

It is a further object of the invention to provide a machine for rapidly and simply effecting any type of partial transverse, or substantially transverse cut to the sheet or plate.

These and other objects of the present invention will become more apparent to those skilled in the art when considering the following description and appended claims.

A machine according to the invention is essentially characterized by providing an operating arm rocking about a pin pivoted to parallel vertical supports or bearings and which can take different positions along slots provided on said parallel vertical supports or bearings, and a working plane located at the bottom of said operating arm, the tools for the desired operation being carriable on said arm and working plane.

A preferred embodiment of a machine according to the invention is shown by mere way of unrestrictive example in the figures of the accompanying drawings, in which:

FIG. 2 is a sectional view taken along line II—II of FIG. 1;

FIG. 3 is a plan view of the working plane;

FIG. 6 is a plan view of some possible transverse cut profiles that can be obtained by the machine set as shown in FIG. 5;

FIG. 7 is a diagrammatic view showing the presetting of the cutter and counter-cutters to provide the cut profiles shown in FIG. 6; and FIG. 8 is a diagrammatic side view with some portions cutaway of the machine as set for nibbling operation.

Figure 1:
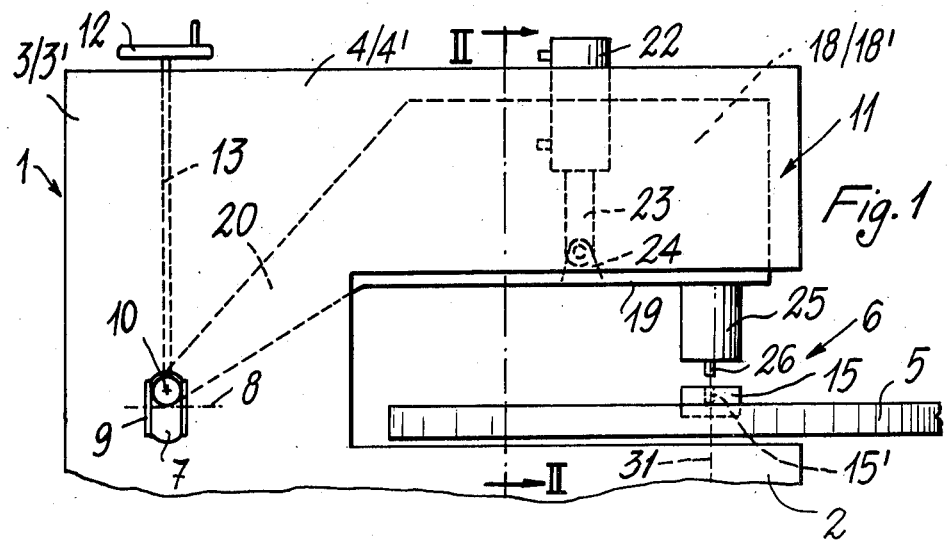
FIG. 1 is a diagrammatic side view of the machine according to the invention as set for punching operation.

Referring to the above figures of the drawings, a machine generally shown at 1 comprises a bedplate 2, rearwardly of which two parallel vertical supports or standards 3 and 3' extend, each of which carrying a horizontal shoulder 4 and 4' extending parallel to and at the top of a working plane 5 having a circular profile and rotably mounted on said bedplate 2 and clampable thereon by conventional means, not shown, at any desired angular position, as more clearly explained in the following.

The configuration and arrangement of the above mentioned elements 2, 3, 3', 4, 4' and 5 is such as to provide a commonly referred to "swan neck" structure, defining a cavity generally shown at 6.

Each of the vertical supports or standards 3 and 3' have a slot 7 provided therein, the horizontal centerline 8 of which lying at the same level as the upper surface of the working plane 5.

On the two vertical edges of each slot 7 guides 9 are provided, along which a horizontal pin 10 is movable and comprises the pivot for an operating arm generally shown at 11.

A suitable system, comprising a handwheel 12 and rod 13, is for moving said pin 10 along guides 9 to the highest and lowest positions relative to said slots 7.

Suitable gudgeons or pins, not shown, cooperating with guides 9 along centerline 8 enable to maintain pin 10 free to rotate about its own axis at the desired position relatively to slots 7, so as to prevent the handwheel-rod system 12, 13 from being subjected to undue stresses during the machine operation.

Centrally, said working plane 5 is provided with a seat 14 for receiving a punching counter-tool 15, and a plurality of radial grooves 16, along which conventional guiding and retaining means, not shown, slide and are clamped for a sheet or plate under working operation.

Along the circular peripheral edge, said working plane 5 has a plurality of cut profiles 17 and 17' at different angular locations for the execution of rounding off operations (only two profiles 17, 17' respectively of 90° and 120° are shown in FIG. 3), as more clearly explained in the following.

The operating arm 11 essentially comprises a box-like body having two vertical walls 18 and 18' and a bottom wall 19, two downward sloping parallel extensions 20 extending rearwardly of the vertical walls 18 and 18' and terminating with circular holes for receiving said pin 10.

A hydraulic or pneumatic cylinder 22 is vertically secured by a collar 21 (see FIG. 2) or equivalent conventional means internally of and on the horizontal shoulders 4 and 4', nearly at the vertical centerline of cavity 6, this cylinder 22 having a stem 23 which is adjustable in length and pivoted on lugs or tabs 24, internally secured to the bottom wall 19 of said operating arm 11.

As particularly shown in FIG. 2, the width of arm 11 substantially corresponds to the distance or spacing between the inner faces of shoulders 4 and 4', so that said arm 11 can rockingly move on a vertical plane about said pin 10, as perfectly guided by said shoulders 4 and 4'.

When using the machine for punching operation, a tool-holder 25 is attached to the bottom wall 19 of arm 11 and aligned with the counter-tool 15, having secured thereon a punch 26 of any desired cross-section and size (such as circular, square and the like), of course corresponding to the seat 15' provided in said counter-tool 15.

When using the machine as a punching press, said handwheel 12 is operated to bring pin 10 to the maximum raised position, as shown in FIG. 1, said pin 10 is secured at such a position by gudgeons or pins cooperating with guides 9, and pressure fluid is introduced into said cylinder 22. The extension of stem 23 causes a downward oscillation for arm 11 and accordingly the punching out of a sheet or plate as suitably positioned on the counter-tool 15. To this end, it should be noted that the axis of pin 10 is at the same level as the active portion of counter-tool 15, so that the short oscillation distance traveled by said punch 26 can be substantially considered as rectilinear. For machines designed for punching sheets or plates of a substantial thickness, it should be apparent to those skilled in the art to modify the lower face of the toolholder 25 and the upper face of the counter-tool 15, so as to compensate for any possible inclinations.

As shown in FIG. 8, a nibbling operation, that is the punching of a sheet or plate in a rapid sequence, while the sheet or plate is moved on the working plane 5 according to desired directions, can be provided by replacing said toolholder 25 with another toolholder 27 fitted with a punch 28, which is resiliently axially slidable along said toolholder 27, controlled for rapid movement in the directions of arrows F by any suitable mechanism 29, such as of piston rod and crank, cam, percussion or the like type.

Where nibbling operation is concerned, the operating arm 11 is used only as a stationary support for the toolholder 27, and accordingly such an arm is retained at its inoperative position by any suitable conventional means, not shown.

Figure 4:
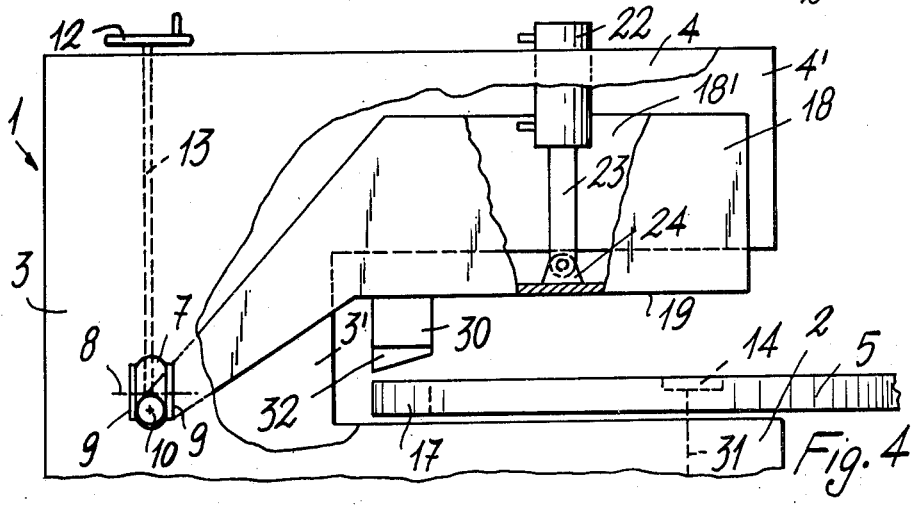
FIG. 4 is a diagrammatic side view with some portions cutaway of the machine as set for rounding off operation.

When using the machine for rounding off operation, as shown in FIGS. 3 and 4, a toolholder 30 is secured to the bottom wall 19 of arm 11 and aligned with one of the cut profiles 17, 17', as previously positioned by rotation of the working plane 5 along a vertical axis 31 and clamped at such a position on said bedplate 2. A rounding off tool 32 is secured on the toolholder 30, this tool having a conventionally inclined cut profile and of course having an angular configuration corresponding to the preselected cut profile 17, 17'.

When used as a rounding off machine, the machine substantially is operated as described for punching machine operation, with the difference that said pin 10 is brought to the lowest position.

When using the machine for sheet or plate cutting, particularly according to the profiles shown in FIG. 6, where a cut down size is shown at 33, a blade 34 is longitudinally secured on the bottom wall 19 of arm 11 and a counter-blade 35 is secured on the working plane 5.

Figure 5:
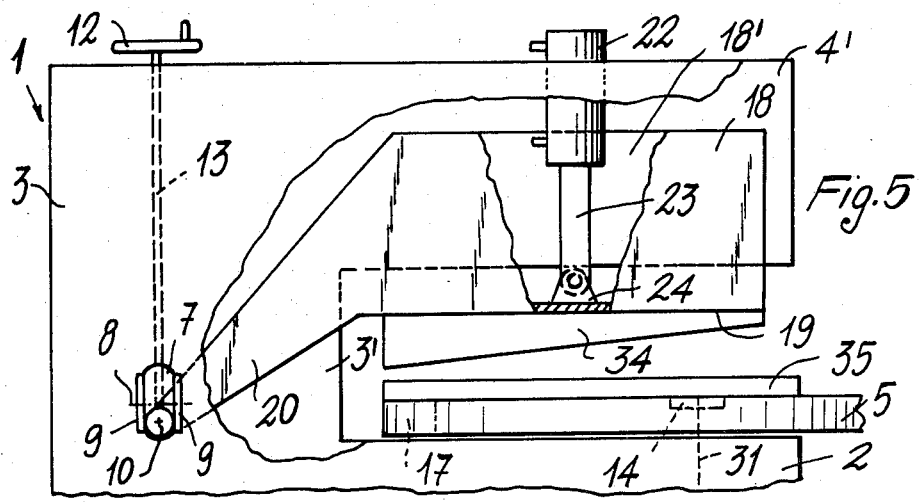
FIG. 5 is a diagrammatic side view with some portions cutaway of the machine as set for cutting operation.

When the machine is to be operated as a shearing machine, said handwheel 12 is acted upon to move pin 10 to the lowest position, as shown in FIG. 5, said pin is secured to such a position by gudgeons cooperating with guides 9, and pressure fluid is introduced into the cylinder 22. The extension of stem 23, in case elongated relative to the operation as punching machine, causes a downward oscillation of arm 11, and as a result the cut by shearing of the sheet or plate suitably placed on the counter-blade 35.

To obtain the profile shown by A in FIG. 6, it is only needed to carry out the operation by two cuts, suitably controlling the length and inclination thereof. To obtain the profiles shown by B, C and D still in FIG. 6, said blade 34 will be a double cut blade and, as shown in FIG. 7, provision will be made for two side counter-blades 35' and 35" and a third cutting edge 36 interposed between said counter-blades 35' and 35".

Those skilled in the art will appreciate that the foregoing will represent the essence of the invention, and that the teachings therein may be used for other applications, without departing for this from the scope of the present invention.

What is claimed is:

1. An apparatus for matching a workpiece with a tool, said apparatus comprising:
   (a) an operating arm;
   (b) a pair of parallel vertical supports;
   (c) means for pivoting said operating arm on said supports, said pivoting means including means defining elongated slots, a pin disposed in said slots and means for differentially positioning said pin along said slots;
   (d) a working plane member disposed in confronting relationship to said operating arm; and
   (e) means associated with said arm and said member for temporarily mounting said tool.

2. An apparatus according to claim 1, wherein said elongated slots have a horizontal centerline which is disposed at the same level as an upper surface of said working plane member.

3. An apparatus according to claim 1, wherein said operating arm essentially comprises a box-like body having two vertical walls and a bottom wall, and two downward inclined extensions extending rearwardly of said vertical walls and terminating with circular holes for receiving said pin.

4. An apparatus according to claim 1, further including a machine bedplate for mounting said working plane member, and wherein: said operating arm includes a pair of shoulders for guiding and retaining said operating arm between said supports; and said operating arm and working plane member cooperate at a cavity defined at the bottom by the machine bedplate and at the top by said pair of shoulders.

5. An apparatus according to claim 4, wherein said pair of shoulders include integral means for rocking said operating arm.

6. An apparatus according to claim 5, wherein: said integral rocking means are positioned rearwardly of a front portion of the arm; and a mechanical device is disposed forwardly of said integral rocking means for reciprocating said tool.

7. An apparatus according to claim 6, wherein said tool comprises a punching member carried at the bottom of said arm and a punching counter-tool disposed on said working plane member.

8. An apparatus according to claim 1, wherein said working plane member is circularly shaped and rotable about a vertical axis centrally of said working plane member, said working plane member having a seat for receiving a punching and nibbling counter-tool, and having a plurality of circumferentially cut profiles at different locations for carrying out rounding off operations.

9. An apparatus according to claim 8, wherein said working plane member is provided with a plurality of radial grooves for positioning said work piece.

* * * * *